Patented Jan. 16, 1940

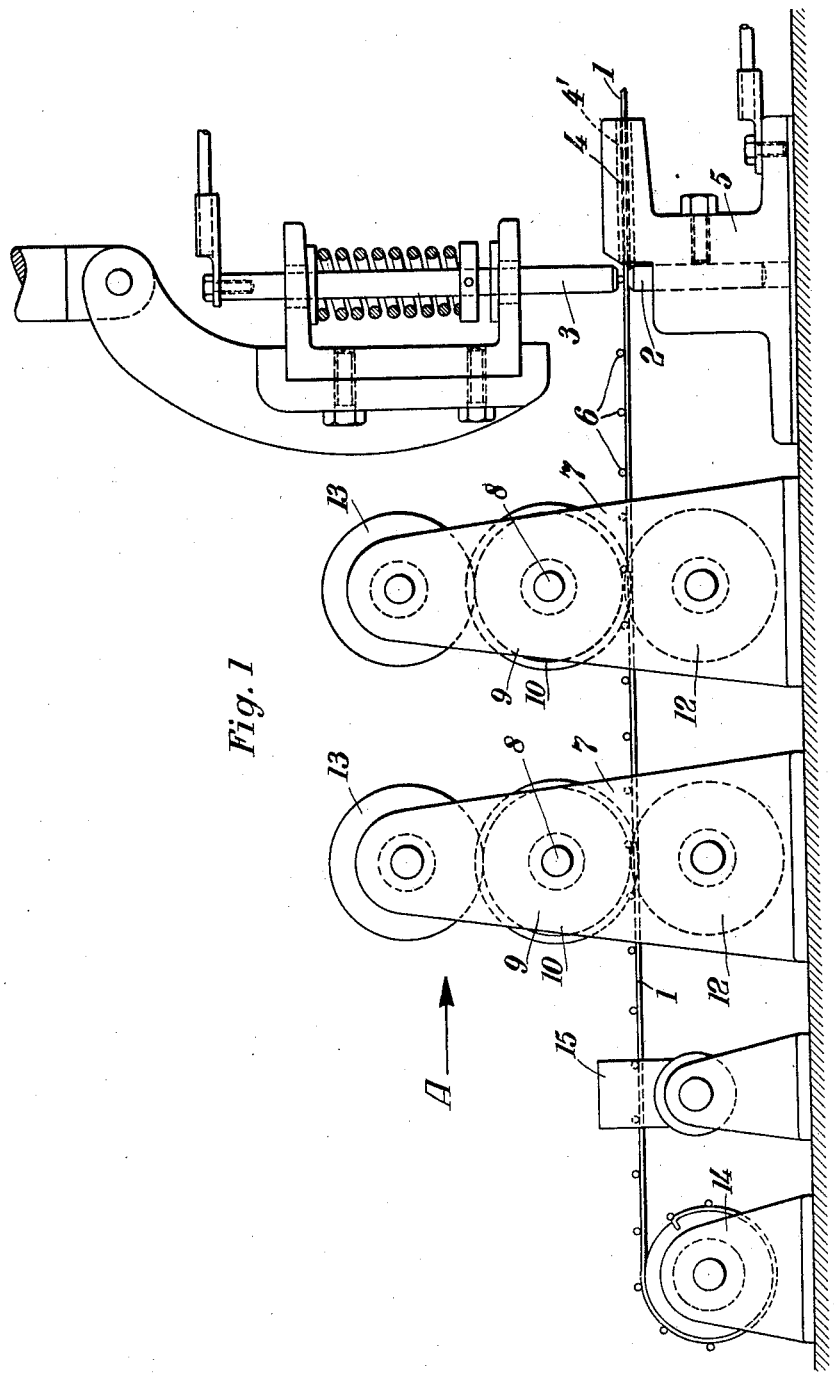

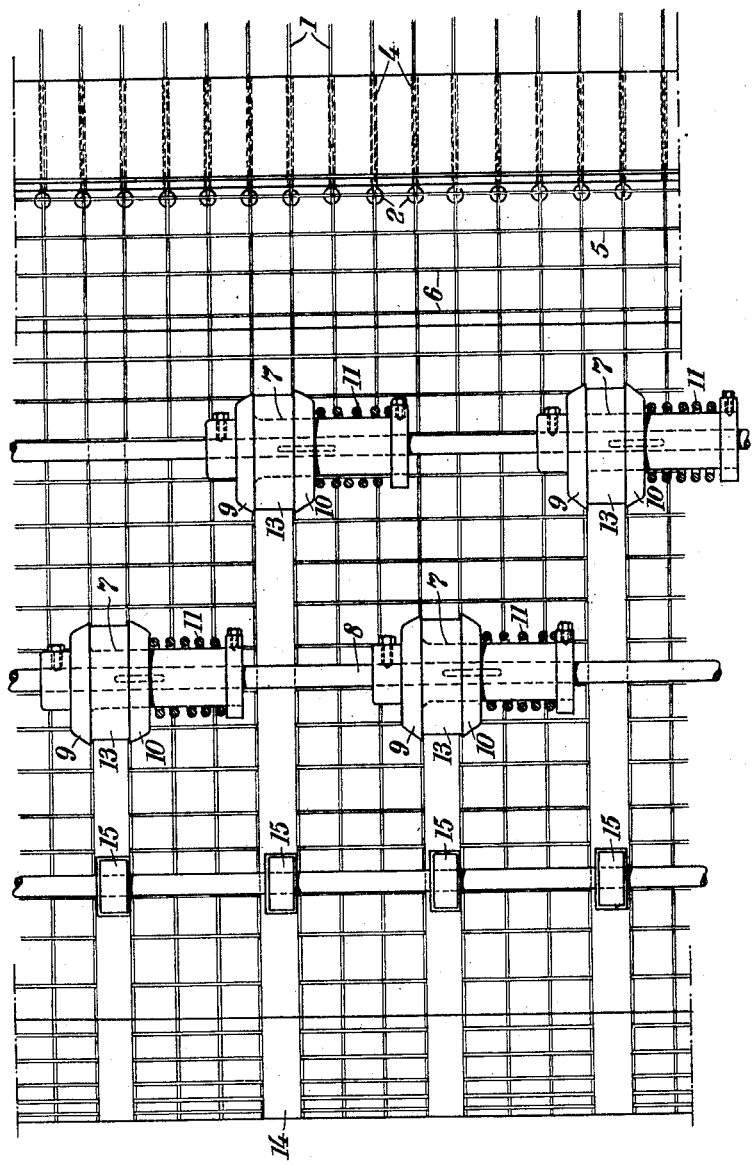

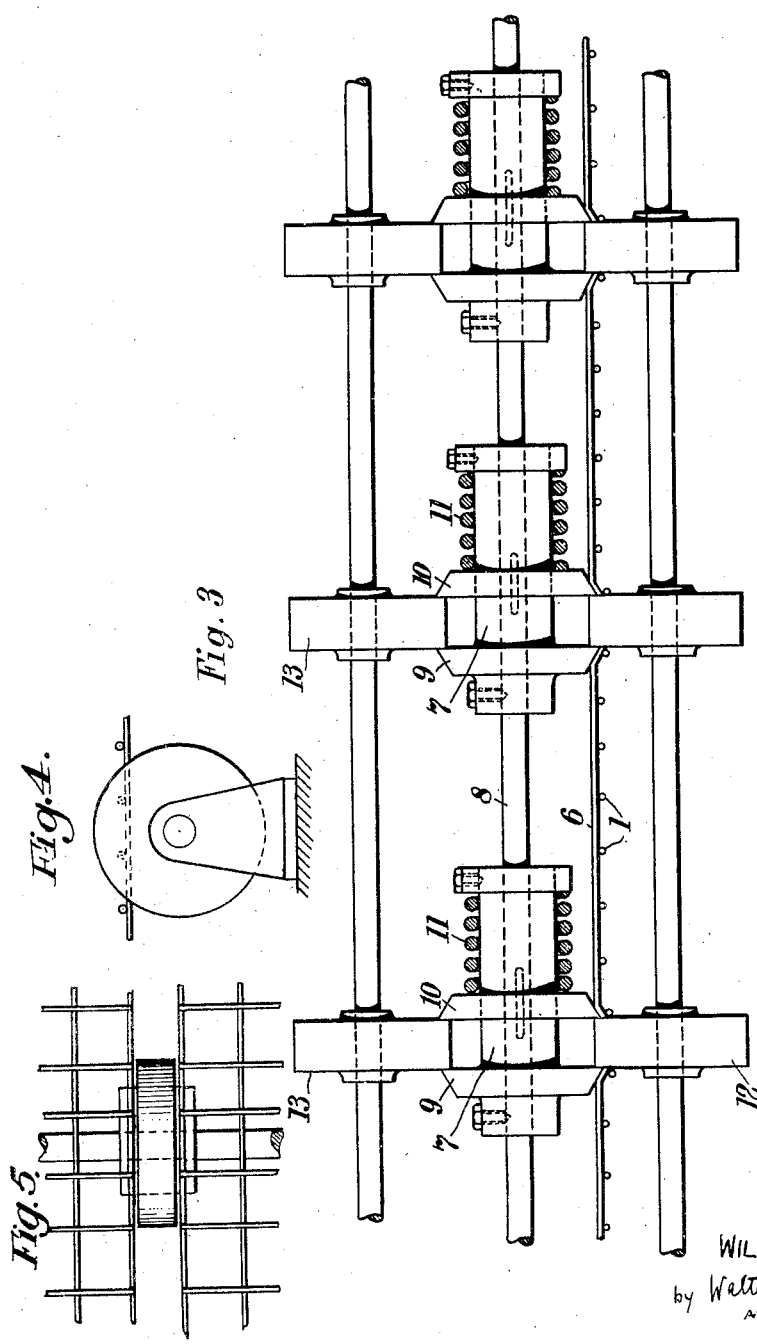

2,187,129

UNITED STATES PATENT OFFICE 2,187,129

APPARATUS FOR MAKING WELDED WIRE NETTING

Wilhelm Krämer, Emmerich Rhine, Germany

Application April 23, 1938, Serial No. 203,727
In Germany April 14, 1936

4 Claims. (Cl. 140—112)

This invention relates to apparatus for making narrow bands of welded wire netting with meshes running in the direction of the length of the netting.

In many cases narrow bands of welded wire netting are required, for example as a substitute for wrapping strips of jute winding round girders and the like.

If for making such narrow bands one of the ordinary machines for preparing rolls of wide welded wire netting were used simply by making on the machine a narrow band instead of a wide one, the disadvantage would be presented that the narrower the band the less would be the area of netting made per unit of time and consequently the greater would be the cost of manufacture, since the length of netting made per unit of time does not vary.

The apparatus according to the present invention permits the production simultaneously of a number of narrow bands of welded wire netting with meshes running in the direction of the length of the netting. It comprises in combination a machine known per se for making welded wire netting in the usual width with guides for the longitudinal wires extending up to the welding electrodes and distributed over the working width of the machine, and a device arranged behind said machine for cutting the wide wire netting into narrow bands, said device comprising one or more cutter sets each having two cutters arranged at a lateral distance from each other corresponding to the space between two longitudinal wires.

In the spirit of the invention, the guides for the longitudinal wires can be tubular and be fitted with steel nozzles having a clear bore little greater than the diameter of the wire, and a length which is great in proportion to the said diameter.

Apparatus according to the invention permits of very greatly reducing the production costs of the narrow bands. At the same time the result is attained that the distance apart of the longitudinal wires in the finished wire netting and the width of the narrow bands remain exactly the same, as also that the cutters of the machine for cutting the wide wire netting into narrow bands do not cut into the marginal longitudinal wires and the leaving of tips of cross wires beyond these side longitudinal wires is absolutely avoided.

According to the invention it is under certain circumstances sufficient if guides are provided for only those longitudinal wires which form the lateral edges of the narrow wire netting bands to be produced.

The cutter sets of the machine for cutting the wide wire netting into narrow bands can according to the invention be displaced with respect to each other in the longitudinal direction of the machine.

Preferably, one of the cutters of each cutter set will be pressed laterally against a counter-cutter located beneath it and if necessary also against a guide disc located above, by means of a spring.

One embodiment of apparatus according to the invention is shown, by way of example, on the accompanying drawings in which:

Figure 1 is a side view,

Figure 2 is a partial plan view and

Figure 3 shows separately a cutter set group seen in the direction of the arrow A of Figure 1.

Figs. 4 and 5 are a side view of a plan view, respectively, of a modified part.

The longitudinal wires 1 run before they come between the welding electrodes 2, 3 through tubular guides 4, the bore of which is only slightly greater than the thickness of the wire and the length of which is great in proportion to the said thickness of the wire. The guides 4 are connected, for example by screwing, to a holder 5 for the welding electrode 2, but they may be fixed on other parts of the apparatus.

The guides 4 which, to give them greater durability, may be lined with steel nozzles 4', extend up to the welding electrodes 2, 3 and are distributed over the working width of the machine.

After the longitudinal wires 1 are welded to the cross wires 6 and in this way a wire netting of usual width has been produced it is cut by cutter sets 7 into narrow bands.

A shaft 8, which carries the two cutters 9, 10 of each set of cutters 7 is driven positively from the machine for making the welded wire netting. Under the pressure of a spring 11, the cutter 10 bears laterally against a counter-cutter 12 placed underneath and against a guide disc 13 located above, in such manner that the counter-cutter 12 and the guide disc 13 are set in rotation by the cutter 10.

The counter-cutter 12 which acts as a spacer with respect to the cutters 9 and 10 has a width corresponding to the space between two neighbored ones of the longitudinal wires so that after the welded wire netting has passed through the cutter sets, no loose ends project beyond the marginal longitudinal wires.

If the narrow bands are to be narrower than the cutter sets 7 compressed in a row will permit, then as shown on Figure 2, the separate cutter sets can be displaced with respect to each other in the longitudinal direction of the machine. In the example shown each two adjacent cutter sets 7 placed in a row cut the wire netting first into a band of double width, which is then again divided by each of two cutter sets 7 arranged in a second row and brought to the correct width.

After the dividing of the wire netting the separate narrow bands are held laterally by guides 15 situated in front of the common winding-up drum 14 so that they do not mutually interfere with each other when being wound up. To protect the narrow bands, the guides can be made as pulleys 15' shown in Figs. 4 and 5 and which are driven at the speed of movement of the wire netting.

I claim:

1. An apparatus for making narrow bands of welded wire netting of longitudinal and transverse wires with meshes running in the direction of the length of the netting, comprising in combination a machine including electrodes for making welded wire nettings of a substantial width with guides for at least two neighbored ones of said longitudinal wires, said guides extending substantially as far as said electrodes, and a device arranged behind said machine for cutting the wire netting into narrow bands, said device comprising at least one set of cutters, said set having two cutters laterally spaced in relation to each other corresponding to the space between said two neighbored longitudinal wires, said cutters being arranged in line with said two guides respectively so as to cut out the pieces of the transverse wires between said two neighbored longitudinal wires.

2. An apparatus for making narrow bands of welded wire netting of longitudinal and transverse wires with meshes running in the direction of the length of the netting, comprising in combination a machine including electrodes for making welded wire nettings of a substantial width, and a device arranged behind said electrodes for cutting the wire netting into narrow bands, said device comprising at least one set of cutters, said set including a driving shaft, two cutters on said shaft, one of said cutters being shiftable relatively to the other one in axial direction, a spacing member between said cutters, said spacer having a width corresponding to the space between two neighbored ones of said longitudinal wires and a spring, said spring being adapted to press said shiftable cutter against said spacing member.

3. In an apparatus of the type described for making net bands of longitudinal and transverse wires a cutter set comprising a driving shaft, a first cutter disc secured to said shaft, a second cutter disc mounted on said shaft to be rotated therewith and shiftable in axial direction, a spring tending to urge said second cutter disc towards said first cutter disc, and a third cutter disc rotatable about an axis parallel and in spaced relation to the axis of said shaft, said third cutter disc being arranged between said first and said second disc so as to cooperate with them, and having a width corresponding to the space between two neighbored longitudinal wires.

4. A cutter set as claimed in claim 3 further comprising a guide disc rotatable about an axis parallel to those of said third disc and of said shaft respectively, said guide disc being arranged between said first and said second cutter discs, and said first and said second disc being adapted to engage said guide disc laterally.

WILHELM KRÄMER.